April 10, 1951   F. S. WHITE   2,548,642
CALCINING DECREPITATING ROCKS, INCLUDING LIMESTONE
Filed June 11, 1948
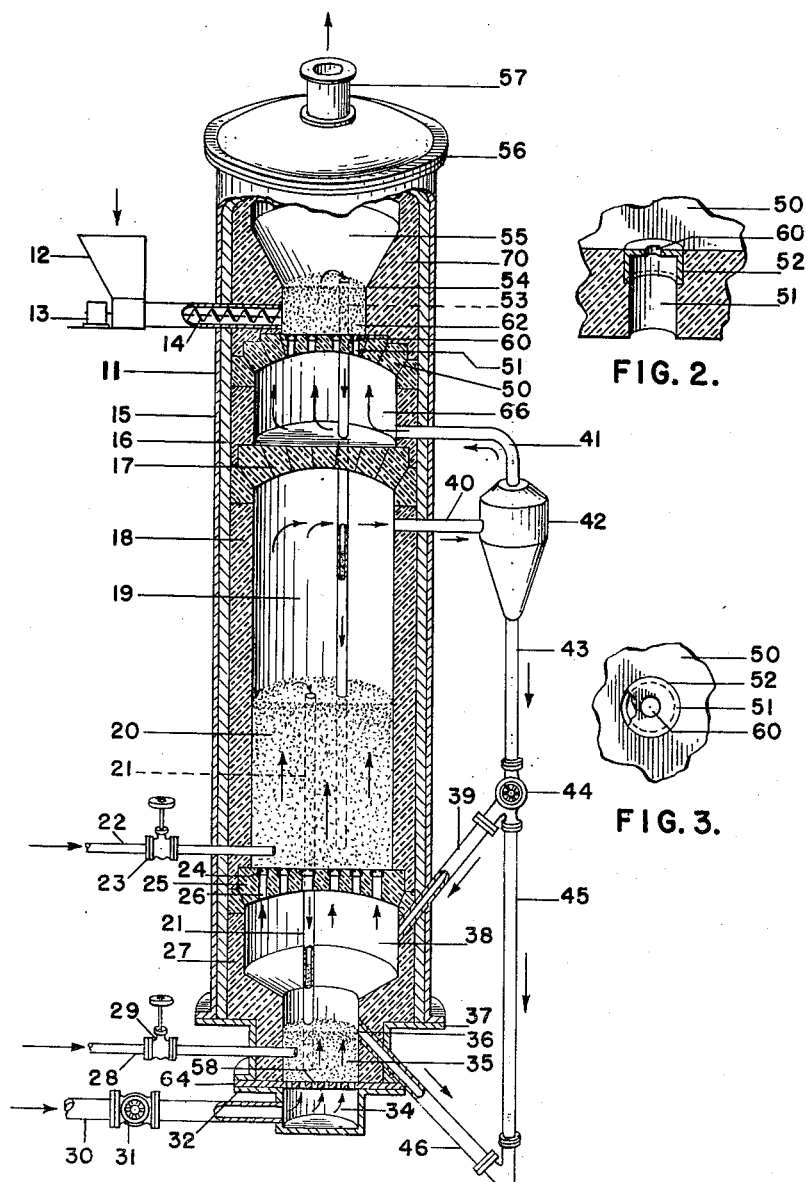
INVENTOR:
FRANK S. WHITE,
BY
Arthur Middleton
ATTORNEY Patented Apr. 10, 1951

2,548,642

UNITED STATES PATENT OFFICE 2,548,642

CALCINING DECREPITATING ROCKS, INCLUDING LIMESTONE

Frank S. White, Stockbridge, Mass., assignor to The Dorr Company, Stamford, Conn., a corporation of Delaware Application June 11, 1948, Serial No. 32,355

5 Claims. (Cl. 263—53)

This invention relates to the heat-treating of decrepitable materials and in particular relates to the calcining of decrepitatable lime-forming materials to form slakeable lime or calcium oxide. It has been proposed heretofore to calcine lime-forming materials in a solids-fluidizing reactor or furnace but when decrepitatable lime-forming materials were so treated difficulties were encountered.

It is an object of this invention to overcome these difficulties and to devise means for achieving the high thermal efficiency and temperature uniformity of a solids-fluidizing system. It seems expedient at this point to explain about a solids-fluidizing system and decrepitation in order that the nature of the difficulties may be appreciated.

A solids-fluidizing system in its most simple form is carried out in a vertical vessel or reactor having a perforated horizontal partition in its lower portion. Powdered solids are supplied to the reactor above the partition through a conduit and treating gas is passed upwardly from the bottom of the reactor below the partition. The gas flows up through the perforations of the partition and through the powdered solids at such a rate that the solids are kept densely suspended as a layer or bed which is commonly referred to as a fluidized bed. These fluidized solids are in a dense, turbulent, mobilized suspension which acts like a liquid and is capable of presenting a level. The fluidized solids are capable of flowing like a liquid under flui-static head but, most pertinently, have substantially uniform temperature conditions throughout their depth. Conduits are provided for separately removing gas from above the bed and for removing treated solids from some point in the bed which point usually is at its fluid-level. During treatment, the bed is heated to the reaction temperature desired; because of the high density of the bed, its turbulence and the great amount of surface area of the solids exposed per unit of volume, intimate contact between gases and solids is achieved and at a substantially uniform temperature.

In more complex forms, a solids-fluidizing reactor may contain a plurality of vertically positioned fluidized beds through which the gas passes upwardly in succession and is emitted from the topmost bed. Treated solids pass downwardly as a confined stream and out of contact with uprising gas through conduits from an upper bed to a point below the fluid-level of a subjacent lower bed, so that there is a general countercurrent treatment going on between solids and gas—the gas rising while the solids descend.

It is known to calcine lime-forming material, as for example limestone, in such a solids-fluidizing reactor whereby carbon dioxide is driven off from the limestone and the solids are converted to calcium oxide. It is also known to calcine lime-forming material in the multi-bed reactor as described above. But when this is attempted with certain materials, they are found to decrepitate in one or more of the heated zones of the reactor.

By decrepitation is meant that the solid particles disintegrate or break down to much finer particles as they are heated; this phenomenon is often accompanied by a crackling sound. The severity and rapidity of this disintegration or particle break-down varies with different materials but in my experimentation I noted that very large amounts of fine particles or dust were produced when calcining certain limestones. Excessive dusting may also be caused by localized thermal shock in the hotter zones and also by the grinding action of the harder particles.

A solids-fluidizing reactor is operated with the gas velocities regulated so that only relatively small amounts of the finer particles or dust are entrained with the upflowing gas and emitted from the reactor. Should a substantial amount of fine particles be entrained with the upflowing gas the following difficulties arise: (1) the fine particles may be removed from a reaction zone or the reactor itself before they are completely treated, (2) the fine particles flow concurrently with the treatment gas from lower to upper compartments which movement partially nullifies the desirable, general counter-current flow of solids and gases and (3) the fine particles, if carried from the reactor while hot, represent an uneconomical heat loss from the reactor. Excessive concurrent flow of evolved gas and solids in the case of lime calcining may cause exothermic re-carbonation of treated solids which is highly disadvantageous.

With certain materials, the concurrent flow of entrained solids and gases may even result in over-treatment of these solids and consequently an undesirable product.

So, it is an object of this invention to minimize, if not avoid, dust entrainment when heat-treating decrepitatable or dust-forming materials by a multi-bed fluidized-solids system, wherein the feed material is successively preheated in one or more upper beds, heat-treated or calcined in an intermediate bed and cooled in one or more lower beds.

This object is attained by positioning a gas-impermeable partition above a dust-forming bed and thus detouring substantially all the heavily dust-laden, solids-fluidizing gases which rise from a dust-forming, dust-rich bed through a dust-removal station. Therein, the gases are dust-diminished and the gases thereafter are conducted to pass through the superjacent pre-heating bed; the removed hot calcined dust is conducted either to ultimate use or into a cooling bed below the calcining bed. Other objects and features of advantage will appear as this specification proceeds.

Referring to the drawings, Figure 1 is a vertical sectional view of an apparatus for carrying out this invention.

Figure 2 is a vertical sectional view of a portion of a horizontal perforated partition in the apparatus, and illustrates the construction thereof.

Figure 3 is a horizontal view of the portion of the partition shown by Figure 2.

In some detail in the drawings:

The reactor furnace collectively designated 11 embodies a metallic gas-tight casing structure having a marginal shell or circular side-wall member 15, a top member 56 detachably secured to the shell member 15, a lower member 37 also detachably secured to shell member 15, and a bottom member 32 detachably secured to said lower member 37, whereby a relatively gas-tight structure is completed. The side-wall member 15 is provided with insulating material 16 positioned between the side wall member 15 and refractory material 18, 27 and 70. Apertured partition plate 64 having apertures 58 divides the bottommost portion of the reactor furnace 11 into an air receiving section or wind-box 34 and a cooling bed 35.

Partition 25, having bores 26 surmounted by apertures 24, is positioned between the disengaging or freeboard section 38, associated with cooling bed 35, and the calcining bed 20. The gas-impermeable partition 17 is positioned between freeboard section 19, associated with bed 20, and a gas-receiving section 66. The apertured partition 50 having bores 51 surmounted by apertures 60 is positioned between the gas-receiving section 66 and the pre-heating bed 62. Freeboard section 55 is above the level 54 of the pre-heating bed 62.

In Figure 2, a section of apertured partition 50 is shown. Restriction orifice section 52 having small apertures 60 is positioned in the partition 50 above the bores 51.

In Figure 3, a horizontal view of apertured partition 50 is shown and illustrates the positioning of small apertures 60 in restriction orifice section 52 above the bores 51.

In starting up the process and apparatus, air is forcibly supplied to the wind-box 34 below the apertured partition plate 64 through conduit 30 and the air supply rate is regulated by positionable valve 31. Fluid or fluidized auxiliary fuel is supplied to the cooling compartment 35 through conduit 28 and the fuel supply rate is regulated by positionable valve 29.

When the reactor 11 is up to the desired heat, the fuel supply to cooling compartment 35 is stopped and calcinable material is fed to the upper portion of the reactor 11. The powdered or finely-divided solid calcinable material is withdrawn from hopper 12 and is propelled by feed-screw 14, actuated by drive-motor 13, into the pre-heating bed 62 below the level 54 thereof.

The powdered solids, being maintained in a fluidized condition in pre-heating bed 62, overflow downwardly through the confined spill-pipe or downcomer 53 and are discharged into calcining bed 20 below the level thereof. Calcined, fluidized solids in bed 20 overflow into the confined spill-pipe 21 and are discharged into the cooling bed 35 below the level thereof. The cooled, fluidized product solids in bed 35 overflow into the upper end 36 of confined discharge conduit 46 which extends downwardly from reactor 11 and are removed therefrom for utilization.

Air is continually supplied through conduit 30 to the wind-box 34 and serves to fluidize the lower cooling bed 35. The upflowing air leaves bed 35 and enters the freeboard section 38. Therefrom, it flows through the apertures 26 and 24 of partition 25 into the fluidized, calcining bed 20. Therein, the air combines with fuel supplied through conduit 22 and maintains the bed 20 at calcining temperature whereby gaseous carbon dioxide is evolved from the fluidized solids and high dust formation occurs. The heavily dust-laden combustion and reaction gases leave dust-rich bed 20 and enter the freeboard section 19 where a portion of the larger particles settle back to the calcining bed 20.

The hot, dust-laden gases from freeboard section 19 flow through conduit 40 to a dust-separating device such as cyclone 42. The hot, dust-diminished gases are conducted through conduit 41 to the gas-receiving section 66. Thence they flow upwardly through the apertures 51 and 60 of partition 50, through fluidized pre-heating bed 62 into freeboard section 55 from which they are conducted from the reactor 11 through conduit 57.

The fine dust separated in the dust-separating device 42 is conducted downwardly through conduit 43 and by suitable positioning of valve 44 may be sent into conduit 39 and discharged into the cooling zone jointly comprised by 38 and 35 or may be sent into conduit 45 and combined with the cooled product at 47. The rate of product withdrawal or the combination thereof with the separated dust may be regulated by positionable valve 48 and the solids finally conducted to further utilization through conduit 49.

In conducting a fluidized-solids system, it is necessary to have a gas velocity through the bed of solid particles in a range sufficient to fluidize the particles but insufficient to form a typical dilute, entraining suspension. The ranges of velocities adaptable for this purpose vary with different materials and their particle size distribution; since the actual gas velocity through the fluidized bed is difficult to measure, it is a practice in the art to record the superficial velocity which is the gas velocity above the fluidized bed and is related to the actual gas velocity in the bed. I find it satisfactory in the practice of my invention to employ superficial gas velocities of the order of 1½ to 2 feet per second; other ranges may be determined by experimentation.

With regard to the fuel supplied to the reactor when conducting endothermic reactions, I prefer to use hydrocarbon oils. However, combustible gases such as coal gas, natural gas, etc., may be used. Also, powdered coals may be employed, either separately supplied as I have indicated in the description of the drawings or mixed with the powdered solids to be treated.

I also treated solids in the minus 10 to minus 65 mesh range and used fluidized bed thicknesses of the order of 3 to 5 feet but these values are not critical. Others skilled in the fluidizing art may depart from these values as they see fit.

I have described my invention in simple form as applied to a three-bed system and apparatus. Obviously, there can be either an increase or a decrease in the number of fluidized beds wherein dust-impeding conditions occur and wherein the gas-detouring, dust-diminishing feature of my invention may be employed by those skilled in the art.

The best embodiment of this invention now known to me has been adopted for illustrative purposes, but this is not to be taken as limiting because obviously there can be used equivalent apparatus as well as changes of constructional detail and arrangement as well as reversal of parts or of steps, so long as they fall within the ambit of my invention.

What I claim is:

1. The process of heat-treating decrepitatible limestone materials to yield lime under efficient thermal conditions, which comprises preheating fluidizable finely divided limestone in a limestone preheating zone, transferring such limestone to a subjacent calcining zone, maintaining a bed thereof in said zone heated to calcining temperature, supplying gas at fluidizing velocity to said zone, removing such gas with entrained lime particles from the calcining zone, passing removed gas through a lime solids-diminishing station external to the respective zones, and supplying the solids-diminished gas to the limestone preheating zone at fluidizing velocities.

2. The process according to claim 1, with the addition of maintaining a gas-preheating zone subjacent to the calcining zone, supplying hot calcined particles to said zone, passing a fluidizing gas upwardly through said particles in order to preheat said gas, and supplying preheated gas to the calcining zone.

3. The process according to claim 2, in which the solids removed from the solids-diminishing station are supplied to the gas-preheating zone.

4. The process according to claim 2, with the addition that the superjacent preheating zone is maintained at a temperature less than calcining temperature.

5. The process according to claim 2, with the addition of maintaining plurality of zones for preheating fluidizable finely divided limestone and a plurality of gas-preheating zones.

FRANK S. WHITE.

REFERENCES CITED

The following references are of record in the file of this patent:

UNITED STATES PATENTS

| Number | Name | Date |
|---|---|---|
| 394,151 | Burns | Dec. 11, 1888 |
| 685,064 | Schubert | Oct. 11, 1901 |
| 2,089,306 | Stimmel et al. | Aug. 10, 1937 |
| 2,367,281 | Johnson | Jan. 16, 1945 |
| 2,409,707 | Roetheli | Oct. 22, 1946 |
| 2,444,990 | Hemminger | July 13, 1948 |
| 2,459,824 | Teffer | Jan. 25, 1949 |